3,533,702
MULTI-PURPOSE OPTICAL MEASURING DEVICE FOR DETERMINING THE POSITION OF AN OBJECT IN TWO COORDINATES
Fromund Hock, Wetzlar, Karl Lang, Atzbach, Kreis Wetzlar, and Heribert Lüssem, Braunfels, Kreis Wetzlar, Germany, assignors to Fa. Ernst Leitz G.m.b.H.
Filed Apr. 19, 1966, Ser. No. 543,575
Claims priority, application Germany, Apr. 24, 1965, L 50,566; Aug. 18, 1965, L 51,411
Int. Cl. G01b *11/00*
U.S. Cl. 356—167                                    13 Claims

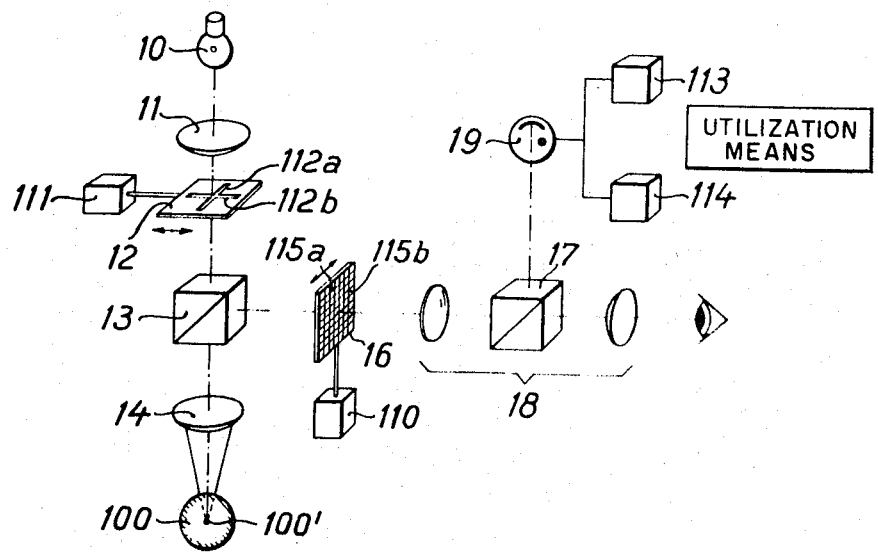
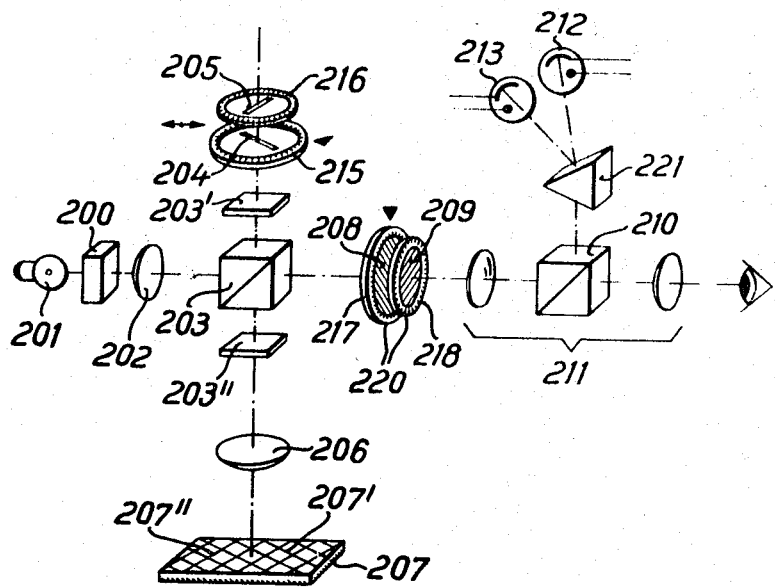

ABSTRACT OF THE DISCLOSURE

An optical measuring device which scans images of two oblong illuminated scanning marks along non-parallel paths on an object to be located or positioned, each mark being scanned parallel to itself. The images are reflected from the object onto an index carrier having intersecting index lines parallel to the reflected images of the scanning marks. Signals resulting from the modulation of the scanning marks by passing over the index lines are utilized to measure the position of the object with respect to the device, or to operate servo means for positioning the object.

BACKGROUND OF THE INVENTION

This invention relates to a multi-purpose optical measuring device for determining the position or the movement of an object in two coordinate directions simultaneously.

DESCRIPTION OF THE PRIOR ART

In the prior art there are a number of measuring devices for determining the position of a reference mark place on an object to be positioned, e.g., the carriage of a machine tool. These instruments make use of a beam of light which is caused to oscillate by means of a deflector and impinges on a reference mark, such as a scale graduation. The error signal for control of a position servo is obtained by comparison of the different times which elapse between the respective crossings of the reference mark. An example of such a device is shown and described in my U.S. Pat. No. 3,254,227. A disadvantage of these instruments is that they can only be used to determine position along one of the two coordinate axes of the plane perpendicular to the optical axis of the device.

SUMMARY OF THE INVENTION

Accordingly it is an object of the invention to provide a multi-purpose optical measuring instrument which can readily be adapted by one having ordinary skill in the art to the determination of the position or the movement of an object in two coordinate axes of a plane perpendicular to the instrument's axis, for the determination of the angle of objects inclined to the instrument's axis, for the measuring of curvature, and for the determination of the eccentricity of revolving shafts in two coordinates.

Briefly, the subject matter of the present invention comprises a multi-purpose optical measuring device for visual and/or photoelectric determination of the position of measuring marks relative to two coordinate axes in one plane. The device is characterized in that at least two oblong scanning marks (e.g., optical slits or mirrors) are provided which are not parallel to each other. The light transmitted from these marks, or elongated light transmitting means, passes through an optical system comprising at least one objective and one beam splitter and, after reflection from the object to be measured or from a reflector which cooperates with said object, and after passing again through said objective and said beam splitter, is projected upon an index carrier. The indices of that carrier consist of intersecting lines which run parallel to the images of the scanning marks. Means are also provided for the separation of signals corresponding to the measurements in the two coordinate directions, those means are placed adjacent to the index carrier in the direction of the impinging light for the evaluation of the measuring result. The identification of the portion of the optical output signal corresponding to one or the other of said scanning marks may be achieved in different ways. For instance, it is possible to move the scanning marks with a different frequency than that with which the index carrier is moved. However, it is also possible to distinguish between said portions by using polarizing means or different colors. According to one embodiment of the invention the scanning marks may be placed in such a way that one of them extends parallel to the direction of their movement. In this case the movement of the index carrier will be performed in the direction of the image of the other mark.

It is further possible to place the scanning marks, or elongated light transmitting means, in such a way that the direction of movement of the scanning diaphragm is parallel to the bisecting line of the angle subtended by the marks. In one special embodiment the scanning marks, or elongated light transmitting means, consist of two narrow mirrors, each one rotatable in its plane independently from the other, which lie close together and are illuminated. The corresponding index carrier consists of two discs provided with lines for indices. The discs are placed close to each other in the direction of light travel and are pivotably mounted. Adjusting means serve to transmit any rotational movement of the carriers of the scanning marks in a synchronous manner to the index carrier. This device makes it possible to adjust the instrument over a wide range of angles between the two measuring coordinates.

DESCRIPTION OF THE DRAWING

The manner in which the invention may be carried out will now be explained with reference to the attached drawings by way of different forms of embodiment. In the drawings FIG. 1 shows a device in which the coordinates of measurement subtend a fixed angle.

FIG. 2 shows a device in which the coordinates of measurement subtend a variable angle,

DESCRIPTION OF THE PREFERRED EMBODIMENTS

Figure 1A:
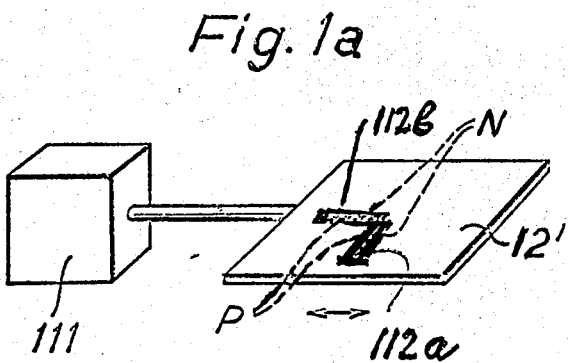
FIG. 1a is a perspective view of an embodiment of a detail of FIG. 1.

In FIG. 1 a light source 10 illuminates via a condensor 11 a movable diaphragm 12 provided with an aperture 112 serving as a scanning mark. The scanning mark aperture 112 consists of two slotlike apertures 112a and 112b which are inclined to each other by 90°. The diaphragm is operated by a driving unit 111 to oscillate with a frequency $f_1$ in the direction of the scanning mark aperture 112b. The light rays emerging from the luminous scanning mark aperture 112 of the diaphragm pass via a beam splitter 13 and an objective 14 onto a reflector 100 which by way of example has the shape of a sphere and has a reflective coating on its outside. As pointed out hereinabove, many reflector arrangements may be provided for use with the device of the present invention by those having ordinary skill in the art and knowledge of the present disclosure. The sphere is positioned so that its center 100' coincides with the image plane of objective 14. Rays reflected from the surface of this sphere travel backwards through objective 14 and, via the beam splitter 13, project images of the scanning mark apertures 112a, 112b on an index carrier 16 which is provided with the indices 115a, 115b. For these indices, lines are used which intersect at the same angle as the scanning mark apertures 112a, 112b. The index carrier is movable in the direction of the indices 115a. It oscillates with a frequency $f_2$ which is different from the frequency $f_1$ and has no higher harmonic wave in common with frequency $f_1$. To this end the index carrier is provided with a driving unit 110. The image of the index plane of carrier 16 is observed by means of an eyepiece 18 and by means of another beam splitter 17. It may also be passed on to a photoelectric transducer 19 to the output terminals of which two evaluation devices such as tuned amplifiers 113, 114 are connected; one of these evaluation devices reacts to a signal of frequency $(2n+1)f_1$, whereas the other one reacts to a signal of frequency $(2n+1)f_2$.

The operation of this embodiment is as follows:

A lateral displacement with respect to the axis of optical elements 11, 13 and 14 of the sphere center 100 causes the image of the scanning mark to be also laterally displaced and the image appears displaced on the index carrier 16 in accordance with the power of the objective 14. Since aperture 112a is perpendicular to the indices 115b, the oscillation of the diaphragm 12 produces no light modulation at the index carrier 16 by interaction with indices 115b. The image of the scanning mark aperture 112a will, however, be modulated by the indices 115a at the frequency $f_1$ and its harmonics. Modulation of the light originating from the scanning mark aperture 112b at frequency $f_2$ and its harmonics is caused by the indices 115b when index carrier 16 oscillates in the indicated direction at a frequency $f_2$.

For a scanning mark a luminous element may be used, the radiation from which is not thermally stimulated. To this end, a luminous semi-conductor may be used which has two inclined PN-junctions which may either be cyclically moved either synchronously or independently from each other. The slots 112a, 112b and the elements 10 and 11 of FIG. 1 are substituted here by the PN luminous semiconductors 112c, 112d mounted on a plate 12'.

FIG. 2 shows an instrument with a slightly different construction which may be used for measurement along coordinates subtending a selectable angle. A light source 201 illuminates the scanning marks via a polariser 200, condensor 202, a beam splitter 203 with a quarter wave plate 203'. The beam splitting plane of the beam splitter is designed as a polariser. The scanning marks 204, 205 consist of narrow mirrors which are rotatable in their own planes and placed as closely together as possible in the direction of the light. They have different reflecting qualities with regard to color (red and green). They are oscillated in unison in the direction of the arrow by means not shown. The narrow mirrors serve as scanning marks and rays reflected from them pass through quarter wave plate 203', beam splitter 203, another quarter plate 203'' and objective 206 on to the reflector 207. This reflector is provided with two fields of lines 207', 207'', and each one of which lies in the direction of a measuring coordinate and parallel to a scanning mark image. Reflector 207 may be an object to be positioned or located by the device of the invention, or an auxiliary device adhered thereto either temporarily or permanently.

Index lines 207', 207'' cause a modulation of the impinging light rays. The modulated light rays reflected from the surface of this reflector travel backwards through the elements 206, 203'', 203 and project the images of the scanning marks on an index carrier 220. This index carrier is formed by two transparent discs; each one has a field of lines 208 and 209 respectively and both are mounted independently and pivotably as close together as possible with the line bearing sides facing each other.

Each disc is arranged in such a way that the lines thereon cannot be made perpendicular to the planes of mirrors 204 and 205, nor nearly so. The carriers of the scanning marks as well as the carriers of the indices are mounted in set-rings 215, 216 and 217, 218 respectively which are provided with a scale. The latter can be used to adjust the scanning marks and the indices to the same angle.

Adjacent to the index carrier in the direction of the light a beam splitter 210 is placed which permits observation of the result of the measurement by means of an eyepiece 211 and at the same time permits the registering of the result of the measurement photoelectrically. To this end a prism 221 is arranged next to the beam splitter 210 in the direction of emerging light; said prism separates the measuring signals according to their color and transmits the signals originating at the scanning mark 204 to a photoelectric transducer 212 while at the same time it transmits the signals originating at the scanning mark 205 to a photoelectric transducer 213. Of the signals obtained in this way from the photoelectric transducer use is made in utilization means which are known in the art and for this reason need not be described in detail.

From the embodiments described it will be readily understood how a separation of the signals originating at the respective scanning marks may be achieved by using light of different colors. Such a separation, however, may also be achieved by using different frequencies of alternating intensity or by polarisation of the light coming from the scanning marks.

Since certain changes may be made in the above constructions without departing from the scope of the invention, it is to be understood that all matter contained in the above description or shown in the accompanying drawings is to be interpreted as illustrative, and not in a limiting sense.

It is to be understood that the following claims are intended to cover all of the generic and specific features of the invention herein described, and all statements of the scope of the invention which, as a matter of language, might be said to fall therebetween.

What we claim is:

1. A multi-purpose optical measuring device for determining the position of an object in two coordinate directions, comprising: a plurality of means acting as light sources transmitting a constant light flux and having at least two thin elongated, non-parallel, cyclically moving light transmitting means; at least two index means; a movable carrier means, carrying said index means, each of said index means corresponding to one of said light transmitting means; an optical system comprising a first beam splitter and an objective lens, said optical system directing light transmitted by said light transmitting means onto said object and directing light reflected from said object onto said index carrier means, the light thus directed from each of said light transmitting means to its corresponding index means cooperating with the corresponding index means to produce modulated light signals, means for detecting said modulated light signals and means for producing from said detected modulated light signals electrical signals which are a function of the position of said object in each of said coordinate directions; separating means for separating said electrical signals into at least two signals each corresponding to one of said transmitting means respectively; and utilization means for utilizing the separated signals.

2. A measuring device as claimed in claim 1 including means for selecting the coordinate directions defined by said light transmitting means at the will of the operator.

3. A measuring device as claimed in claim 1 in which said light transmitting means comprise semiconductor elements including light transmitting PN-junctions.

4. A measuring device as claimed in claim 1 in which said light transmitting means are jointly cyclically moved in a direction perpendicular to the major dimension of one of them, and said carrier means is cyclically moved in a direction perpendicular to the major dimension of the other one of them.

5. A measuring device as claimed in claim 1 in which said light transmitting means are jointly cyclically moved along a line bisecting the angle between the major dimensions of said light transmitting means.

6. A measuring device as claimed in claim 1 in which said light transmitting means comprise narrow mirrors placed close together and rotatably mounted in their respective planes, said carrier means comprises two transparent discs having light obstruent lines for index means, said discs being placed close together and being rotatably mounted, and means for synchronous adjustment of said mirrors and said transparent discs.

7. A measuring device as claimed in claim 1, said light transmitting means comprising a source of light and a diaphragm, said diaphragm having coplanar slots, said coplanar slots being two divergent intersecting slots; said diaphragm in an inoperative ready to start position being interposed in axial alignment between said source of light and said beam splitter.

8. A measuring device as claimed in claim 7, and a condensing lens interposed between said source of light and said diaphragm in said axial alignment.

9. A measuring device as claimed in claim 1, said object being a mirror.

10. A measuring device as claimed in claim 1, further comprising a second beam splitter mounted in alignment with said index means, said second beam splitter being adapted to split the light beam reflected by the object into a first partial beam for visual observation and a second partial beam for photoelectric scanning.

11. A measuring device as claimed in claim 10 comprising optical means mounted in the way of the partial light beam for visually observing the position of said object in the coordinate system of said index means.

12. A measuring device as claimed in claim 1, said beam splitter and objective interposed underneath said light transmitting means in initial position in axial alignment with said light transmitting means and said object, said beam splitter having means to split a beam of light into a first light beam directed toward said object and to send the light beams returned from the object inclined to said first light beam.

13. A measuring device as claimed in claim 12, further comprising a second beam splitter generating a visual beam in alignment with said first beam splitter's second light beam, said second beam splitter further generating an optical beam inclined to said visual beam.

References Cited

UNITED STATES PATENTS

| 2,775,158 | 12/1956 | Mitchell | 350—10 |
| 3,322,953 | 5/1967 | Zuckerbraun | 250—235 |

FOREIGN PATENTS

| 125,912 | 1/1948 | Sweden. |

RONALD L. WIBERT, Primary Examiner

J. ROTHENBERG, Assistant Examiner

U.S. Cl. X.R.

250—237; 356—169